United States Patent [19]
Jeon

[11] Patent Number: 5,845,014
[45] Date of Patent: Dec. 1, 1998

[54] CIRCUIT FOR DECIDING DCT BLOCK CLASSES

[75] Inventor: Hyung Jin Jeon, Seoul, Rep. of Korea

[73] Assignee: LG Electronics Inc., Seoul, Rep. of Korea

[21] Appl. No.: 658,830

[22] Filed: May 31, 1996

[30] Foreign Application Priority Data

Jun. 2, 1995 [KR] Rep. of Korea .................. 1995 14660

[51] Int. Cl.$^6$ ............................... G06K 9/36; G06K 9/46
[52] U.S. Cl. ............................................ 382/250; 382/251
[58] Field of Search ..................................... 382/250, 251; 348/403, 404, 405

[56] References Cited

U.S. PATENT DOCUMENTS 5,481,309 1/1996 Juri et al. .................................. 348/405
5,552,829 9/1996 Kim et al. ................................ 348/392

*Primary Examiner*—Leo H. Boudreau
*Assistant Examiner*—Dmitry A. Novik
*Attorney, Agent, or Firm*—Loeb & Loeb LLP

[57] ABSTRACT

A circuit it for deciding classes resulting from 8×8 DCT or 2×4×8 DCT blocks includes a block forming circuit for converting a digital video signal into a predetermined block structure, a mode deciding section for detecting still/motion of the digital video signal block to generate a mode signal, a DCT section for selectively performing the 8×8 DCT or 2×4×8 DCT upon the block supplied from the block forming circuit according to the mode signal of the mode deciding section, a controlling section for controlling DCT data coefficients output according to the mode signal from mode deciding section, a scanning section for zig-zag scanning data in an 8×8 activity detecting pattern upon the output of the 8×8 DCT block from the DCT section and zig-zag scanning data in a 2×4×8 activity detecting pattern upon the output of the 2×4×8 DCT block under the control of the controlling section, a comparative circuit for comparing the data coefficient values from the scanning section with threshold values of a predetermined number, and a class deciding section for deciding the classes according to the comparison values from the comparative circuit. Thus, the class of corresponding block is decided by using the activity detecting pattern differently produced by the 8×8 DCT block and 2×4×8 DCT block to minimize loss of a horizontal edge of the 2×4×8 DCT block, thereby preventing degradation of picture quality.

3 Claims, 5 Drawing Sheets

$\Delta DC_2 = DC_1 - DC_2$

CIRCUIT FOR DECIDING DCT BLOCK CLASSES

BACKGROUND OF THE INVENTION

1. Field of the Invention

The present invention relates to a class deciding circuit resulting from discrete cosine transform (hereinafter referred to as "DCT") blocks. Specifically, the present invention relates to a circuit for deciding DCT block classes wherein classes of 8×8 DCT blocks and 2×4×8 DCT blocks, which involve different activity detection patterns, are decided in accordance with DCT coefficients of respective blocks in order to minimize loss of edge in a video signal.

2. Discussion of the Prior Art

The term "DCT" generally defines a method for converting an image from a spatial area to a frequency area, thus eliminating spatial redundancy of video data in a digital video transmitting apparatus. Spatial redundancy occurs because adjacent pixels in a picture have similar values.

When DCT is performed, however, the resulting coefficient values tend to be less related. Energy is concentrated toward lower frequencies due to disproportionate spatial frequency. Thus, information at high frequency portions, such as portions involving severe variations between pixels, i.e., a border line of the face, a border line of the nose, or hair; are thrown away. To enhance coding efficiency of a block having variations between pixels, both 2×4×8 DCT and 8×8 DCT are utilized.

FIG. 1A represents an 8×8 activity detecting pattern, in which a DC value is placed at the top left of the pattern, and high frequency coefficients are placed right and downward.

FIG. 1B represents are 2×4×8 activity detecting pattern, in which the upper 4×8 block contains the frequency value of the sum of fields, and the lower 4×8 block contains the frequency value of the difference between the fields. Thus, the 2×4×8 DCT pattern is the addition of two 4×8 activity detecting patterns.

Four steps are necessary to decide classes of activity of the blocks subjected to the DCT. Here, the term "class" designates the categorization of respective DCT blocks corresponding to characteristics of respective DCT blocks. A DCT block allotted with a high class is subjected to greater quantization and a DCT block allotted with a low class is subjected to less quantization.

Because the DCT block of a simple configuration has little activity, a lower class is allotted and low quantization width is precisely coded. On the other hand, the DCT block of a complicated configuration has high activity and is allotted with the high class involving a high quantization width. Thus, high coding efficiency allows for picture quality without severe deterioration.

However, picture quality is visibly distorted when a block containing a border of some kind is allotted with the high class coded with the high quantization width. Blocks of complicated configurations can be allotted with the high class without deterioration, but the block having an edge pattern or border should be allotted with the class considering the configuration of the edge. Therefore, an error is rarely visible if the DCT block having the edge configuration is allotted the lower class even if that block has high activity.

FIGS. 2A–C illustrate three kinds of edges and the coefficient pattern developed when the edge blocks are subjected to the 8×8 DCT and 2×4×8 DCT. Oblique-lined portions denote a high value and the other portions have a value of nearly zero.

Specifically, when the block including the vertical edge, as shown in FIG. 2A, is subjected to the DCT, coefficient data is produced solely by the first row. This is identical in both 8×8 DCT and 2×4×8 DCT. Accordingly, the coefficient data of the first oblique-lined column is excluded from the object of the activity detection. Thus, activity is detected by scanning the DCT block such that the oblique-lined portion in FIG. 2A is excluded when scanning, but the other portions are subjected to the scanning to detect the activity. The class is then allotted in accordance with the detected activity.

When the block including the horizontal edge, as shown in FIG. 2B, is subjected to the DCT, the coefficient data is produced solely by the first column. This also is identical in both 8×8 DCT and 2×4×8 DCT. Accordingly, the coefficient data of the first oblique-lined column is excluded from the object of the activity detection.

On the other hand, if the image including the vertical edge has slight motion and is of the DCT within a frame (8×8 DCT), the high frequency component in the vertical direction is increased and the coefficient data value at the left bottom corner is enlarged. Consequently, the range of the activity detecting object marked in FIG. 3A is set.

When the edge image as shown in FIG. 2C is subjected to the 2×4×8 DCT, the coefficient data is produced by two columns distanced by a predetermined interval. Accordingly, this coefficient pattern is different from the coefficient pattern produced by the 8×8 DCT, and the coefficient data of the oblique-lined two columns is excluded from the object of the activity detection.

FIGS. 3A and 3B represent the positions of the activity detecting patterns utilized for deciding the activity when the edge block as shown in FIG. 2C is subjected to the 8×8 DCT. While the activity detecting pattern at the oblique-lined portion is utilized for the activity decision, that of the other portion is not utilized.

As described above, the coefficient patterns of the conventional 8×8 DCT block and 2×4×8 DCT block are produced differently in accordance with the edge configuration. Despite the difference, however, the conventional 8×8 DCT block and the 2×4×8 DCT block are decided by using the 8×8 DCT data coefficient. Thus, the horizontal edge of the 2×4×8 DCT block is degraded.

SUMMARY OF THE INVENTION

Accordingly, it is an object of the present invention to provide a circuit for deciding DCT block classes, wherein an 8×8 DCT block is decided differently from a 2×4×8 DCT block, and thus degradation of picture quality is prevented.

An object of the present invention is the provision of a circuit for deciding DCT block classes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above objects and advantages and in accordance with the purpose of the invention, as embodied and broadly described, the present invention is a class deciding circuit for deciding DCT block classes of a digital video signal, comprising block forming means for converting the digital video signal into a predetermined block structure, mode deciding means for detecting motion of the predetermined block structure and selectively generating an 8×8 DCT mode signal or a 2×4×8 DCT mode signal, DCT means for selectively performing 8×8 or 2×4×8 DCT upon the predetermined block structure in accordance with the DCT mode signal generated by the mode deciding means, control output means for outputting coefficient data in accordance with the mode signal from the mode deciding means, scanning means for selectively zig-zag scanning output of the DCT means in an 8×8 or 2×4×8 activity detecting pattern data in accordance with the output coefficient data of the control output means and outputting a data coefficient value, comparison means for comparing the output data coefficient value with predetermined threshold values, and class deciding means for deciding the DCT block classes in accordance with the comparison values of the comparison means.

It is understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DESCRIPTION OF THE PREFERRED EMBODIMENT

Reference will now be made in detail to the present preferred embodiment of the present invention, an example of which is illustrated in the accompanying drawings.

Figure 4:
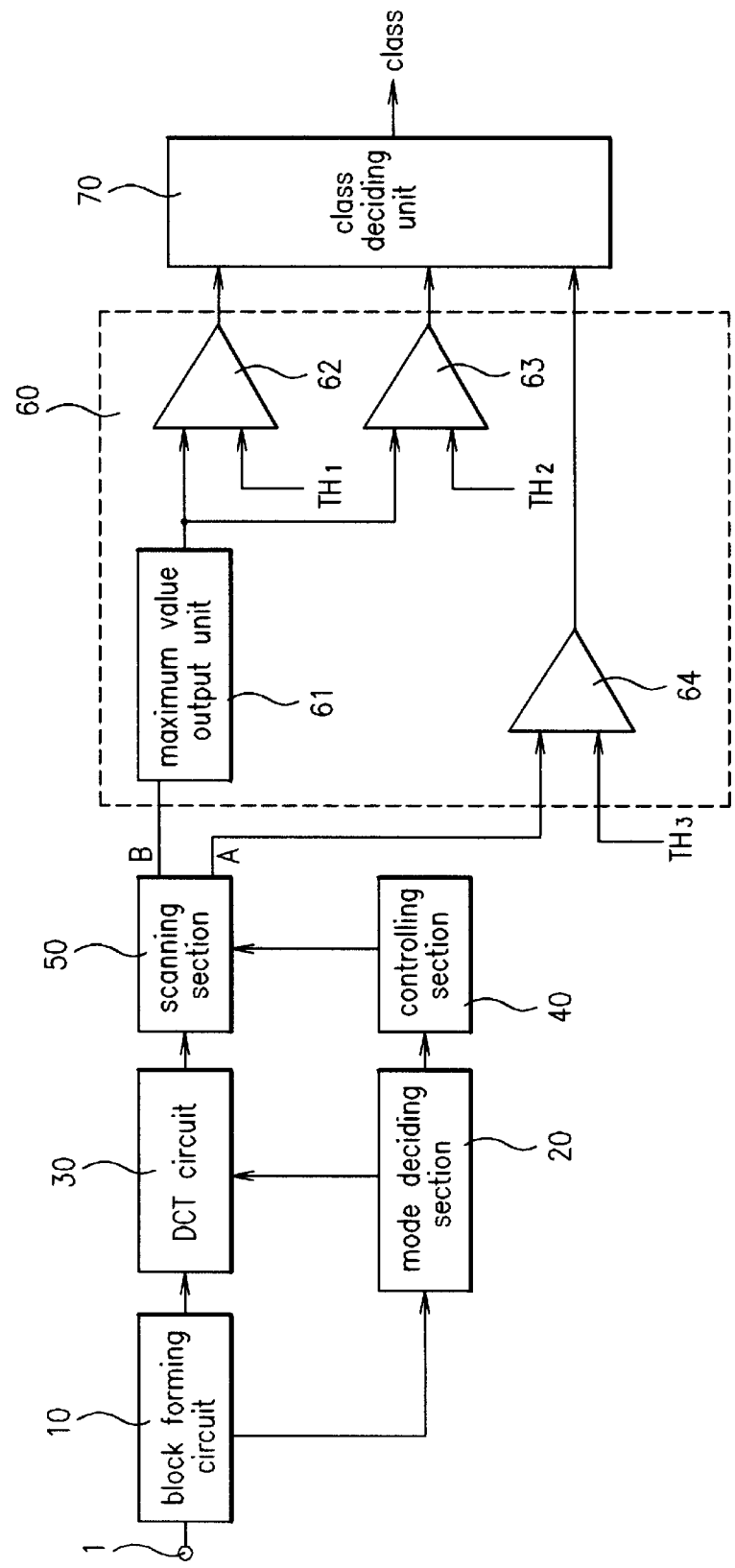
FIG. 4 is a block diagram illustrating a circuit for deciding DCT block classes according to the present invention.

With reference to FIG. 4, block forming circuit 10 converts a digital video signal into a predetermined block structure, such as an 8×8 DCT block. Block forming circuit 10 is connected to mode deciding section 20, which detects a motion of the block supplied from block forming circuit 10 and provides a DCT selection mode signal.

Block forming circuit 10 also is connected to DCT circuit 30. DCT circuit 30 performs either an 8×8 DCT or 2×4×8 DCT upon data received from block forming circuit 10.

Mode deciding section 20 also is connected to controlling section 40, which produces a control signal to provide coefficient data that is varied in accordance with the 8×8 DCT or 2×4×8 DCT. DCT circuit 30 also is connected to scanning section 50. Scanning section 50 provides the data from DCT circuit 30 via zig-zag scanning in the pattern of 8×8 DCT data coefficient or 2×4×8 DCTed data coefficient.

Scanning section 50 is connected to comparative circuit 60, which compares a data coefficient value supplied from scanning section 50 with at least two threshold values to produce a corresponding comparison value. Comparative circuit 60 is connected with to class deciding section 70. Class deciding section 70 judges activities and decides classes in accordance with the comparison value from comparative circuit 60.

Comparative circuit 60 includes maximum value output unit 61 for producing the greatest absolute value of the 8×8 DCTed data coefficient or 2×4×8 DCTed data coefficient from scanning section 50, and a first comparator 62 for comparing an output of maximum value output unit 61 with first threshold value TH1. Comparative circuit 60 also includes a second comparator 63, which compares the output of maximum value output unit 61 with second threshold value TH2, and third comparator 64, which compare all AC coefficients (except for a DC coefficient) among the data coefficients received from scanning section 50 with third threshold value TH3.

Figure 1A:
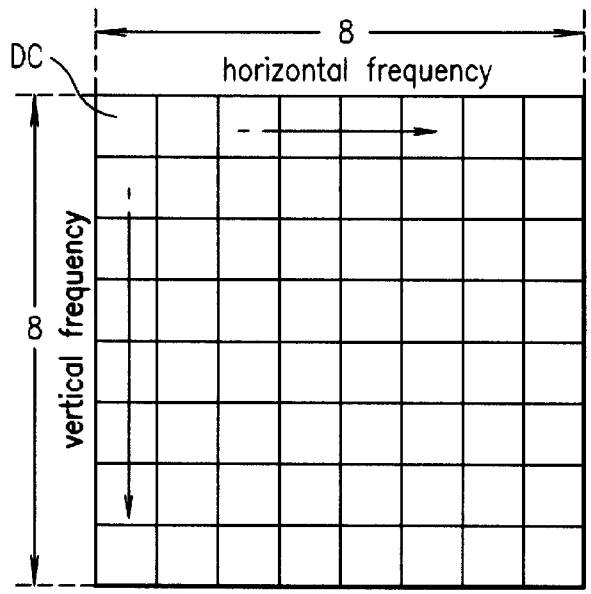
FIG. 1A illustrates a prior art 8×8 DCT coefficient pattern.
Figure 1B:
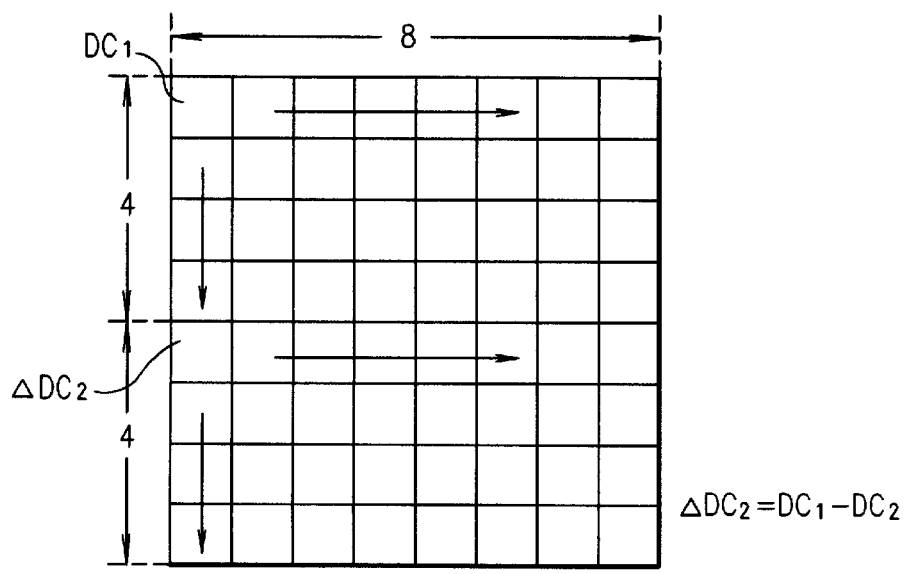
FIG. 1B illustrates a prior art 2×4×8 activity detecting pattern.
Figure 2A:
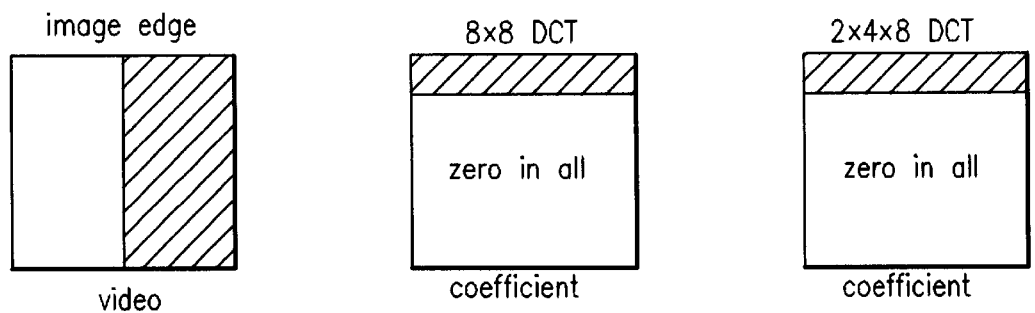
FIGS. 2A–2C illustrate coefficients produced from the 8×8 DCT or 2×4×8 DCT of FIGS. 1A–1C.
Figure 2B:
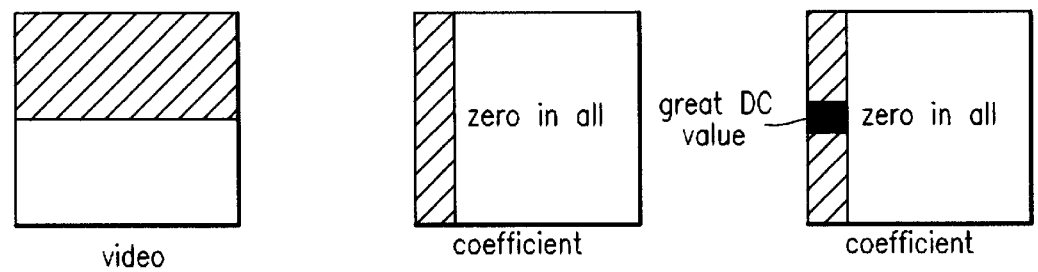
Figure 2C:
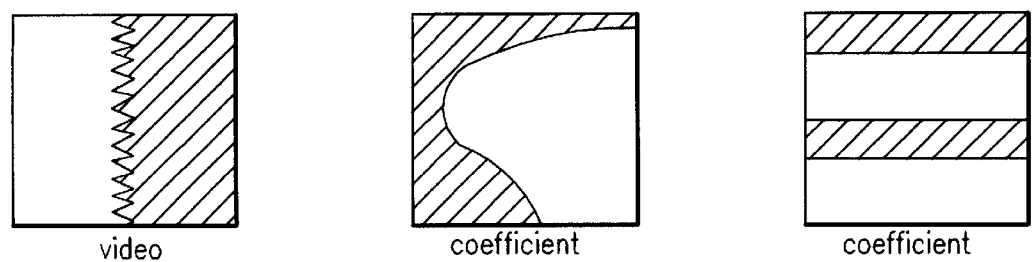
Figure 3A:
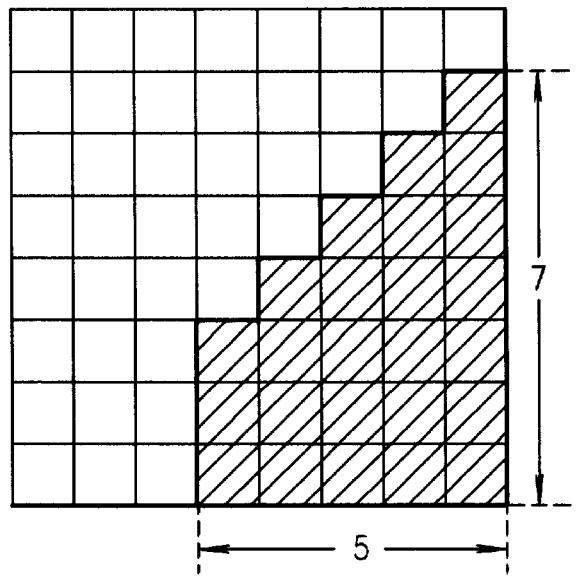
FIGS. 3A and 3B illustrate the activity detecting area in the 8×8 DCT block of FIG. 1.
Figure 3B:
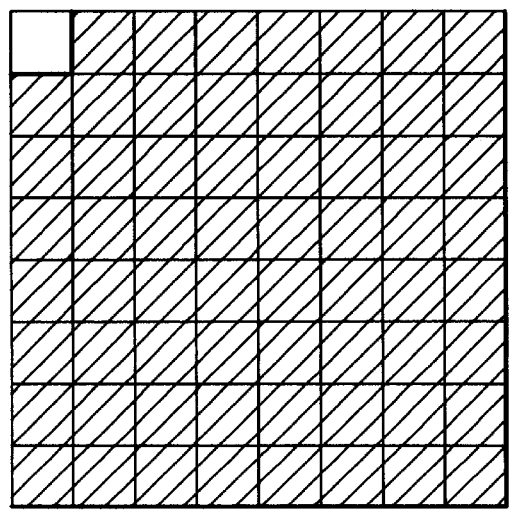
Figure 5A:
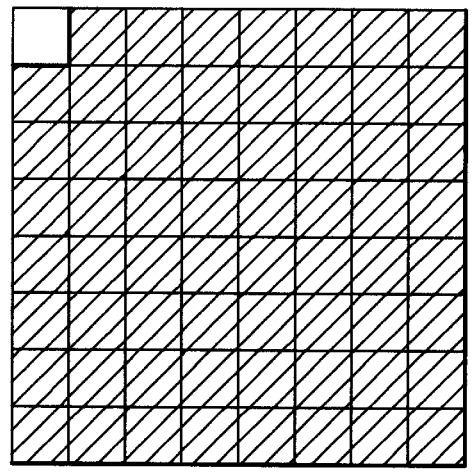
FIGS. 5A–5C illustrate the activity detecting pattern utilized for the class decision of FIG. 4.
Figure 5B:
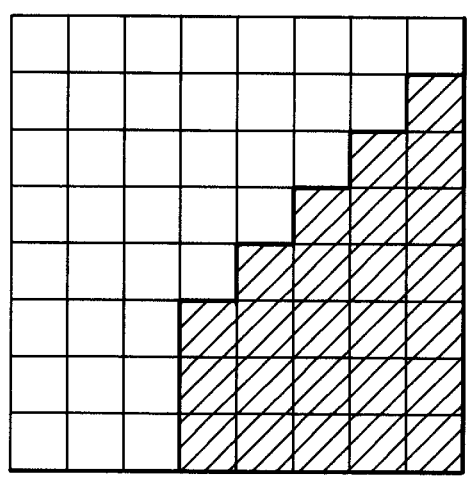
Figure 5C:
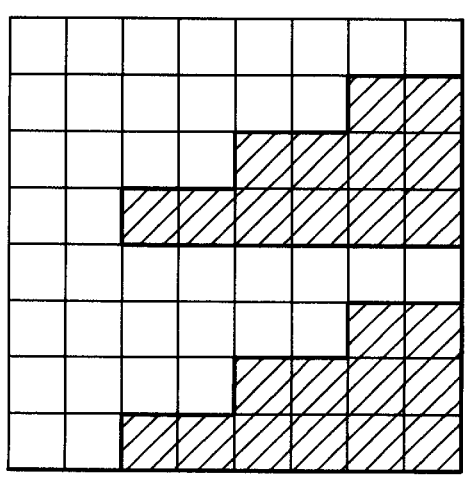

FIGS. 5A and 5B illustrate the DCT data coefficients provided via scanning section 50. Specifically, FIG. 5A represents overall coefficient data, except for the DC component, in which 8×8 DCT is identical to 2×4×8 DCT to be provided via third comparator 64 of comparative circuit 60. FIG. 5B represents the data coefficient pattern obtained when the edge block as shown in FIG. 2C is subjected to the 8×8 DCT. FIG. 5C represents the data coefficient pattern obtained when the edge block as shown in FIG. 2C is subjected to the 2×4×8 DCT, which is zig-zag scanned by scanning section 50 and provided to maximum value output unit 61.

In the preferred embodiment of this present invention as shown in FIG. 4, the digitized video data from input terminal 1 is converted such that the video of one frame consisting of two fields is converted in block forming circuit 10 to have the structure of a predetermined block, e.g., 8×8 DCT block, which is supplied to mode deciding section 20 and DCT circuit 30.

Mode deciding section 20 detects the motion of the block from block forming circuit 10.

In accordance with the present invention, when mode deciding section 20 decides that the block from block forming circuit 10 is a still picture with no motion, the 8×8 DCT mode signal is provided to DCT circuit 30 and controlling section 40. When mode deciding Section 20 decides that the block involves motion, the 2×4×8 DCT mode signal is provided to DCT circuit 30 and controlling section 40.

Accordingly, DCT circuit 30 performs the 8×8 DCT with respect to the block from block forming circuit 10 upon the supply of 8×8 DCT mode signal from mode deciding section 20, and performs the 2×4×8 DCT with respect to the block upon the supply of the 2×4×8 DCT mode signal. If the 8×8 or 2×4×8 DCT is performed with respect to the predetermined block in DCT circuit 30, the 8×8 coefficient data (i.e., the coefficient data of DC and AC) is generated as shown in FIG. 5A.

The DC coefficient in the 8×8 coefficient data generated from DCT circuit 30 is excluded in deciding the activity, and only 63 AC coefficients, excluding the DC, are supplied to third comparator 64 of comparative circuit 60 to be utilized in deciding the activity.

On the other hand, once the 8×8 DCT mode control signal is supplied from controlling section 40, scanning section 50 zig-zag scans the AC coefficients of the 8×8 DCT block supplied from DCT circuit 30 from the lower AC toward the higher AC, as shown in FIG. 5B. If the 2×4×8 DCT mode control signal is supplied from controlling section 40, the AC coefficient data of the 2×4×8 DCT block supplied from DCT circuit 30 is subjected to the zig-zag scanning from the lower AC toward the higher AC to be provided to comparative circuit 60, as shown in FIG. 5C.

In the 8×8 DCT mode, overall AC coefficient data, except for the DCT coefficient (labeled as "A" on FIG. 4), is supplied to third comparator 64 to be compared with third threshold value TH3, as shown in FIG. 5A. The activity detecting pattern (labeled as "B" on FIG. 4), as shown in FIG. 5B, is supplied to maximum value output unit 61, which provides the greatest absolute values among the input coefficient values to first and second comparator 62 and 63 to compare them with first and second threshold values TH1 and TH2, respectively.

When a coefficient higher than third threshold value TH3 exists in the data coefficients supplied to third comparator 64, class deciding section 70 decides the corresponding block as class 3 unconditionally. On the other hand, if no coefficient higher than third threshold value TH3 is supplied to third comparator 64, class deciding section 70 decides the block as class 2. If the coefficient is lower than second threshold value but higher than first threshold value TH1 of first comparator 62, it is decided as class 1; and if the coefficient is lower than first threshold value TH1, it is decided as class 0.

Therefore, with the 8×8 DCT block, if any one of the coefficients presented in FIG. 5A is higher than third threshold value TH3, it is decided as class 3 having the highest activity. Otherwise, the coefficients presented in FIG. 5B are compared with second and first threshold values TH2 and TH1 to decide the classes 0, 1 and 2.

Threshold values TH1, TH2 and TH3 may be arbitrarily set to satisfy the following condition:

$$0<TH1<TH2<TH3 \leq 255$$

where the class 0 has the lowest activity and class 3 has the highest activity.

On the other hand, with the 2×4×8 DCT mode, overall AC coefficient data, except for the DC coefficient as presented in FIG. 5A, is supplied to third comparator 64 to be compared with third threshold value TH3. The activity detecting pattern as shown in FIG. 5C is supplied to maximum value output unit 61 which then provides the greatest absolute values among the input coefficients to first and second comparators 62 and 63 to compare them with first and second threshold values TH1 and TH2, respectively. When any one of the coefficients presented in FIG. 5A is higher than third threshold value TH3, it is sorted as class 3 having the highest activity by class deciding section 70. Otherwise, the coefficients presented in FIG. 5C are compared with second and first threshold values TH2 and TH1 to decide the classes 0, 1 and 2.

Therefore, the class decided in class deciding section 70 is applied when the DCT block is quantized to allow for optimum quantization. The quantization process utilizes the classes decided in class deciding section 70 and the quantization step displays the data having been subjected to the DCT in the restricted number of bits. The data quantity is therefore decreased.

In the circuit for deciding the DCT block classes according to the present invention as described above, the different activity detecting patterns produced in accordance with the 8×8 DCT block and 2×4×8 DCT block are compared with respective threshold values to decide the class of corresponding DCT block, so that loss of the horizontal edge of the 2×4×8 DCT block is minimized and deterioration of picture quality is prevented. It should be clear to one of ordinary skill in the art from the above description that the circuit described above for use with a vertical bisection of a block into the 2×4×8 DCT block can be used equally well with a horizontal bisection of the 8×8 DCT block.

While the present invention has been particularly shown and described with reference to a preferred embodiment thereof, it will be understood by those skilled in the art that various changes in form and details may be effected therein without departing from the spirit and scope of the invention as defined by the appended claims.

It will be apparent to those skilled in the art that various modifications and variations can be made in the circuit for deciding DCT block classes of the present invention without departing from the scope or spirit of the invention. Thus, it is intended that the present invention cover the modifications and variations of this invention provided they come within the scope of the appended claims and their equivalents.

What is claimed is:

1. A class deciding circuit for deciding DCT block classes of a digital video signal, comprising:

block forming means for converting the digital video signal into a predetermined block structure;

mode deciding means for detecting motion of the predetermined block structure and selectively generating an 8×8 DCT mode signal or a 2×4×8 DCT mode signal;

DCT means for selectively performing 8×8 or 2×4×8 DCT upon the predetermined block structure in accordance with the DCT mode signal generated by the mode deciding means;

control output means for outputting coefficient data in accordance with the mode signal from the mode deciding means;

scanning means for selectively zig-zag scanning output of the DCT means in an 8×8 or 2×4×8 activity detecting pattern data in accordance with the output coefficient data of the control output means and outputting a data coefficient value;

comparison means for comparing the output data coefficient value with predetermined threshold values; and class deciding means for deciding the DCT block classes in accordance with the comparison values of the comparison means.

2. The circuit for deciding DCT block classes as claimed in claim 1, wherein the scanning means vertically bisects one block when the mode deciding means generates as 2×4×8 DCT block mode signal.

3. The circuit for deciding DCT block classes as claimed in claim 1, wherein the class deciding means decides the class of the DCT blocks among four classes.

* * * * *